United States Patent
Li et al.

(10) Patent No.: US 12,536,912 B2
(45) Date of Patent: Jan. 27, 2026

(54) METHOD FOR PREDICTING PEDESTRIAN CROSSING BEHAVIOR FOR INTERSECTION

(71) Applicant: SOUTHEAST UNIVERSITY, Nanjing (CN)

(72) Inventors: Xu Li, Nanjing (CN); Jinchao Hu, Nanjing (CN); Weiming Hu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 306 days.

(21) Appl. No.: 18/249,715

(22) PCT Filed: Apr. 12, 2021

(86) PCT No.: PCT/CN2021/086572
§ 371 (c)(1),
(2) Date: Apr. 19, 2023

(87) PCT Pub. No.: WO2022/110611
PCT Pub. Date: Jun. 2, 2022

(65) Prior Publication Data
US 2023/0410659 A1  Dec. 21, 2023

(30) Foreign Application Priority Data
Nov. 26, 2020  (CN) .......... 202011357565.7

(51) Int. Cl.
*G06V 20/70* (2022.01)
*G06V 10/26* (2022.01)
(Continued)

(52) U.S. Cl.
CPC .......... *G08G 1/166* (2013.01); *G06V 10/26* (2022.01); *G06V 10/7715* (2022.01);
(Continued)

(58) Field of Classification Search
None
See application file for complete search history.

(56) References Cited

U.S. PATENT DOCUMENTS

| | | | |
|---|---|---|---|
| 2019/0325595 A1* | 10/2019 | Stein | G06T 7/55 |
| 2020/0293064 A1 | 9/2020 | Wu et al. | |

(Continued)

FOREIGN PATENT DOCUMENTS

| | | |
|---|---|---|
| CN | 105678034 A | 6/2016 |
| CN | 111860269 A | 10/2020 |
| CN | 112487954 A | 3/2021 |

*Primary Examiner* — Oneal R Mistry
(74) *Attorney, Agent, or Firm* — MUNCY, GEISSLER, OLDS & LOWE, P.C.

(57) ABSTRACT

A method for predicting a pedestrian crossing behavior for an intersection includes the following steps: step 1: designing an immediate reward function; step 2: establishing a fully convolutional neural network-long-short term memory network (FCN-LSTM) model to predict a motion reward function; step 3: training the fully convolutional neural network-long-short term memory network (FCN-LSTM) model based on reinforcement learning; and step 4: predicting the pedestrian crossing behavior and performing hazard early-warning. The technical solution does not require establishment of a complex pedestrian movement model or preparation of massive labeled data sets, achieves autonomous learning of pedestrian crossing behavior features at the intersection, predicts their walking, stopping, running and other behaviors, especially predicts the pedestrian crossing behavior when inducing hazards such as pedestrian-vehicle collision and scratch in real time, and performs hazard early-warning on crossing pedestrians and passing vehicles.

5 Claims, 3 Drawing Sheets

(51) Int. Cl.
*G06V 10/77* (2022.01)
*G06V 10/774* (2022.01)
*G06V 10/82* (2022.01)
*G06V 20/52* (2022.01)
*G06V 40/20* (2022.01)
*G08G 1/052* (2006.01)
*G08G 1/16* (2006.01)

(52) U.S. Cl.
CPC ............ *G06V 10/774* (2022.01); *G06V 10/82* (2022.01); *G06V 20/52* (2022.01); *G06V 20/70* (2022.01); *G06V 40/25* (2022.01); *G08G 1/052* (2013.01)

(56) References Cited

U.S. PATENT DOCUMENTS

| | | | |
|---|---|---|---|
| 2021/0150309 A1* | 5/2021 | Dancel | G06V 10/82 |
| 2021/0201052 A1* | 7/2021 | Ranga | G06N 3/0442 |
| 2021/0201145 A1* | 7/2021 | Pham | B60W 60/001 |

* cited by examiner

METHOD FOR PREDICTING PEDESTRIAN CROSSING BEHAVIOR FOR INTERSECTION

TECHNICAL FIELD

The present disclosure relates to a prediction method, specifically relates to a method for predicting a pedestrian crossing behavior for an intersection, and belongs to the technical field of traffic participant behavior modeling and prediction.

BACKGROUND

As a major participant in road traffic, a pedestrian's behavior is an important factor affecting traffic safety, especially at an intersection where there are a large amount of crossing behaviors at school entrances and exits and entrances without signal access. The quantity of traffic accidents that occur when pedestrians cross a street accounts for nearly 70% of the total quantity of pedestrian traffic accidents. Therefore, identification and prediction of a pedestrian crossing behavior at the intersection, especially real-time prediction of the pedestrian crossing behavior when inducing hazards such as pedestrian-vehicle collision and scratch, and hazard early-warning for crossing pedestrians and passing vehicles are basic requirements for building an intelligent roadside system, which is also conducive to reducing an incidence rate of traffic accidents at key road segments such as the intersection, and guaranteeing safety of the pedestrians in a traffic environment.

Currently, there are two main types of methods for predicting the pedestrian crossing behavior. One type of method is based on models, such as a social force model, an energy function or potential energy field model, and a Markov model. This type of model converts personality characteristics of pedestrian movement and interactions between the pedestrians and other traffic participants into concepts, such as social force and potential energy fields. A mathematical analytical expression of the social force or the potential energy fields is constructed the models to further infer a pedestrian movement behavior. The other type of method is based on data-driven deep learning, such as a recurrent neural network (RNN), a long-short term memory (LSTM) network, a social long-short term memory (S-LSTM) network, a generative adversarial network (GAN), and a graph attention (GAT) network. The recurrent neural network (RNN) and the long-short term memory (LSTM) network regard a continuous behavior of the pedestrians as a time series, thereby realizing serialized prediction of the pedestrian behavior. On this basis, a social long-short term memory (S-LSTM) network model considers interdependence between the pedestrians and surrounding pedestrians, and utilizes different features of the surrounding pedestrians to predict a pedestrian movement trajectory. A model based on the generative adversarial network (GAN) can generate a plurality of acceptable pedestrian movement trajectories. A graph attention (GAT) network model enhances an inferential capability of pedestrian movement trajectory prediction by using a graph attention mechanism.

Although the current methods have achieved good effects in predicting a simple pedestrian behavior and interactions between the pedestrians, both the current two types of methods require establishment of a mathematical model of pedestrian movement in advance or construction of a large number of labeled data sets. For an environment, such as the intersection, where pedestrians share a space, the pedestrian crossing behavior is interdependent, meanwhile, influenced by factors such as an age, a gender, psychology, and an educational level, there are individual differences when the pedestrians cross the street, and there are behaviors with certain randomness, such as walking, stopping, and running. For the method based on the models, it is not possible to construct a clear mathematical model to describe the pedestrian crossing behavior at the intersection. For the method based on the data-driven deep learning, it is difficult to obtain massive labeled data sets to extract interdependence and randomness features of the pedestrian crossing behavior. Aiming at the difficulties existing in the current method based on the models and method based on the data-driven deep learning in predicting the pedestrian crossing behavior at the intersection, it is necessary to invent a method for predicting a pedestrian crossing behavior at an intersection, which does not require the establishment of a complex pedestrian movement model in advance or the preparation of the massive labeled data sets. The method can achieve autonomous learning of pedestrian crossing behavior features at the intersection and predict their walking, stopping, running and other behaviors.

SUMMARY

For problems existing in the related art, the present disclosure provides a method for predicting a pedestrian crossing behavior for an intersection. The technical solution does not require establishment of a complex pedestrian movement model or preparation of massive labeled data sets, achieves autonomous learning of pedestrian crossing behavior features at the intersection, predicts their walking, stopping, running and other behaviors, especially predicts the pedestrian crossing behavior when inducing hazards such as pedestrian-vehicle collision and scratch in real time, and performs hazard early-warning on crossing pedestrians and passing vehicles, which is conducive to reducing an incidence rate of traffic accidents at key road segments such as the intersection, and guaranteeing safety of the pedestrians in a traffic environment.

In order to achieve the objective of the present disclosure, the technical solution adopted by the present disclosure is that: millimeter wave radar and a visual camera are selected as roadside devices for data acquisition. Firstly, a modified time-to-collision (MTTC) is taken as an immediate reward for a status; secondly, a fully convolutional neural network-long-short term memory network (FCN-LSTM) model is established to extract interdependence and randomness features of a pedestrian crossing behavior, and to predict a motion reward function value; then, the fully convolutional neural network-long-short term memory network (FCN-LSTM) model is trained based on reinforcement learning; and finally, pedestrian behaviors such as walking, running, and stopping when crossing a street are predicted, and hazard early-warning is performed on crossing pedestrians and passing vehicles. The method of the present disclosure specifically includes the following steps:

A method for predicting a pedestrian crossing behavior for an intersection, step 1: designing an immediate reward function.

A modified time-to-collision (MTTC) currently detected by roadside millimeter wave radar is taken as an immediate reward $r_t$ of a status. TTC only considers that a velocity of a vehicle behind is higher than a velocity of a vehicle ahead during defining of vehicle collision, and ignores many collisions caused by a difference in acceleration or deceleration. In particular, when a vehicle encounters crossing pedestrians at the intersection, the vehicle brakes to decelerate or accelerates to pass. As a result, hazards may be caused. Therefore, the modified time-to-collision (MTTC) that considers a relative position, relative velocity, and relative acceleration between the vehicle and a pedestrian is defined:

$$r_t = MTTC_t = \frac{\Delta V_t \pm \sqrt{\Delta V_t^2 + 2\Delta A_t \Delta X_t}}{\Delta A_t} \quad (1)$$

where $\Delta X_t$ represents the relative position, $\Delta V_t$ represents the relative velocity, $\Delta A_t$, represents the relative acceleration, and according to positive and negative conditions of $\Delta X_t$, $\Delta V_t$, and $\Delta A_t$, and by making $MTTC_t \geq 0$, ± in formula (1) is taken.

In a case that a plurality of pedestrians or a plurality of vehicles are detected within a certain status of the intersection, the MTTC between each pedestrian and all the vehicles is calculated according to formula (1), and a minimum MTTC is taken as an immediate reward $r_t$ for a current status of the pedestrian.

Step 2: establishing a fully convolutional neural network-long-short term memory network (FCN-LSTM) model to predict a motion reward function.

In consideration of interdependence between pedestrian behaviors, which is manifested as spatial interdependence and mutual constraint of the pedestrians, a fully convolutional neural network (FCN) is utilized to realize semantic segmentation, pedestrians in an input image are separated from a background, and spatial information of the pedestrians in the input image is preserved. In addition, in consideration of temporal continuity of the pedestrian behaviors, a long-short term memory network (LSTM) is utilized to make use of forward behavior information of the pedestrians. The fully convolutional neural network-long-short term memory network (FCN-LSTM) model is established to predict a reward function value of the pedestrian behaviors, that is, a pedestrian crossing image at the intersection taken by a roadside camera is input to the FCN-LSTM model, and the FCN-LSTM model outputs reward function values corresponding to three discrete behaviors of walking, running, and stopping. A specific structure of the FCN-LSTM model is as follows:

1) A standard convolutional layer 1_1: an input of a first layer is an original image with pixels of Q×Q' and a channel number of 3, 96 11×11 convolutional kernels are used to be convolved with the original input image, a step length is 4, and edges are not expanded; rectified linear units (ReLU) serve as an activation function of neurons, and after ReLU activation, a feature map with a dimension of $$\frac{Q}{4} \times \frac{Q'}{4} \times 96$$

is output;
a local response normalization layer 1_2: to prevent data overfitting of the standard convolutional layer 1_1 after ReLU activation, local response normalization is performed; and
a maximum pooling layer 1_3: a pooling layer is then connected to perform maximum pooling on an image outputted after convolution, a size of the pooling layer is 3×3, a step length is 2, and an output feature map of the first layer is obtained, which has a dimension of $$\frac{Q}{8} \times \frac{Q'}{8} \times 96.$$

2) A standard convolutional layer 2_1: an input of the convolutional layer 2 is the output feature map of the convolutional layer 1, the number of convolutional kernels is 256, the size of the convolutional kernels is: 5×5, edges are expanded with padding=2, and a step length is 1; after ReLU activation, a feature map with a dimension of $$\frac{Q}{8} \times \frac{Q'}{8} \times 256$$

is output;
a local response normalization layer 2_1: to prevent data overfitting of the standard convolutional layer 2_1 after ReLU activation, local response normalization is performed; and
a maximum pooling layer 2_3: the pooling layer is then connected to perform maximum pooling on an image outputted after convolution, a size of the pooling layer is 3×3, a step length is 2, and an output feature map of a second layer is obtained, which has a dimension of $$\frac{Q}{16} \times \frac{Q'}{16} \times 256.$$

3) A standard convolutional layer 3_1: an input of the convolutional layer 3 is the output feature map of the convolutional layer 2, the number of convolutional kernels is 384, the size of the convolutional kernels is: 3×3, edges are expanded with padding=1, a step length is 1, and after ReLU activation, an output feature map of a third layer is obtained, which has a dimension of $$\frac{Q}{16} \times \frac{Q'}{16} \times 384.$$

4) A standard convolutional layer 4_1: an input of the convolutional layer 4 is the output feature map of the convolutional layer 3, the number of convolutional kernels is 384, the size of the convolutional kernels is: 3×3, edges are expanded with padding=1, a step length is 1, and after ReLU activation, an output feature map of a fourth layer is obtained, which has a dimension of $$\frac{Q}{16} \times \frac{Q'}{16} \times 384.$$

5) A standard convolutional layer 5_1: an input of the convolutional layer 5 is the output feature map of the convolutional layer 4, the number of convolutional kernels is 256, the size of the convolutional kernels is: 3×3, edges are expanded with padding=1, and a step length is 1; after ReLU activation, a feature map with a dimension of $$\frac{Q}{16} \times \frac{Q'}{16} \times 256$$

is output; and a maximum pooling layer 5_2: a pooling layer is then connected to perform maximum pooling, a size of the pooling layer is 3×3, a step length is 2, and an output feature map of a fifth layer is obtained, which has a dimension of $$\frac{Q}{32} \times \frac{Q'}{32} \times 256.$$

6) A fully convolutional layer 6_1: to allow an input picture to be any size larger than a certain size, an input of the fully convolutional layer 6 is the output feature map of the convolutional layer 5, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096.$$

7) A fully convolutional layer 7_1: an input of the fully convolutional layer 7 is the output feature map of the convolutional layer 6, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096.$$

8) Upsampling and skip structure processing: 32-times upsampling is performed on the output feature map of the fully convolutional layer 7_1, and 16-times upsampling is performed on the output feature map of the standard convolutional layer 4_1, to obtain an image of the same size as the original input image. Due to the too small output feature map of the fully convolutional layer 7_1 and excessive detail losses, in order to enable an output image of the fully convolutional layer 7_1 have richer global information and more local details, a skip structure is adopted. That is, a 32-times upsampling image of the output feature map of the fully convolutional layer 7_1 and a 16-times upsampling image of the output feature map of the standard convolutional layer 4_1 are added and fused to realize global prediction of the images while predicting local image details, and a Q×Q' segmented image is outputted as an input of the next layer.

9) An LSTM layer: in consideration of certain continuity of the pedestrian crossing behavior, in order to utilize the temporal continuity of the pedestrian behaviors, the LSTM layer is selected, an input dimension is Q, a time step is Q', and an output dimension is 3.

10) Output: the reward function values corresponding to the three behaviors of walking, running, and stopping of the pedestrians in the status are outputted. q(s, walking), q(s, running), q(s, stopping), S represents a current status of the pedestrians. A predicted value q_value={q(s, walking), q(s, stopping), q(s, running)} of the behavioral reward function is composed of q(s, walking), q(s, running), q(s, stopping).

Step 3: training the fully convolutional neural network-long-short term memory network (FCN-LSTM) model based on reinforcement learning.

The FCN-LSTM model established in step 2 is trained based on a reinforcement learning thought. In consideration of certain randomness of the behavior of the pedestrian in a case of crossing the street, in an iterative training process, pedestrian walking, stopping, and running behaviors are randomly selected with a probability of ζ. The pedestrian behavior is greedily selected with a probability of 1−ζ, that is, a behavior corresponding to a maximum value of the behavior reward function outputted in 10) of step 2 is selected. Thus, the FCN-LSTM model is capable of learning characteristics that the pedestrian crossing behavior has certain purposiveness and different pedestrian individuals have certain randomness at the same time. Specific training steps are as follows:

Sub-step 1: initializing q(s, a)=0. q(s, a) represents a motion value function value of the pedestrians, s represents the current status, a represents a current behavior, and α∈{walking, stopping, running}. The current status s is initialized.

Sub-step 2: executing a one-step behavior. A random number random of [0,1] is randomly generated, and in a case of random <ζ, a pedestrian behavior is randomly selected, that is, a behavior is randomly selected from a pedestrian behavior motion set {walking, stopping, running}; and random ≥ζ, ζ is intended to be valued as 0,1, and a greedy policy is used to select the pedestrian behavior, namely, a behavior that maximizes the value q(s, a) from the pedestrian behavior motion set {walking, stopping, running}.

Sub-step 3: updating the status and the reward function values. After the pedestrian executes the one-step behavior, a new status s' is launched, and the reward function values are updated according to formula (2) by utilizing the immediate reward function $r_t$ designed in step 1.

$$q(s_t,a_t) \leftarrow q(s_t,a_t) + \alpha(r_t + \gamma \max_a q(s_{t+1},a) - q(s_t,a_t)) \quad (2)$$

where $q(s_t, a_t)$ represents a motion reward function value in the current status, t represents the time step, $\max_a q(s_{t+1}, \alpha)$ represents a maximum motion reward function value in a next status, α represents an exploration rate, α is intended to be taken as 0.1, $r_t$ represents an immediate reward value in the current status, γ represents a reward attenuation factor, that is, an impact of subsequent statuses on a current motion is decreased gradually, γ∈[0,1], and γ is intended to be valued as 0.95.

Sub-step 4: taking updated $q(s_t, a_t)$ in formula (2) as a true value, and taking a maximum value of q_value={q(s, walking), q(s, stopping), q(s, running)} outputted by the FCN-LSTM model in step 2 as a predicted value; and training the FCN-LSTM model established in step 2 based on a gradient descent method, and optimizing weight parameters of the FCN-LSTM model.

Sub-step 5: executing sub-step 2, sub-step 3, and sub-step 4 repeatedly until s terminates, that is, the pedestrian completes the crossing behavior.

Step 4: predicting the pedestrian crossing behavior and performing hazard early-warning.

Step 3 is executed repeatedly to complete a plurality of rounds of training of the FCN-LSTM model. An image of a camera deployed on a roadside of the intersection is inputted to the trained FCN-LSTM model, the FCN-LSTM model outputs q_value={q(s, walking), q(s, stopping), q(s, running)}, and a behavior corresponding to max{q(s, walking), q(s, stopping), q(s, running)} is used as the pedestrian crossing behavior at the intersection predicted by the present disclosure. In a case that the predicted behavior is walking or running according to the current status, an early-warning signal is transmitted to the crossing pedestrian at the intersection to remind them of possible hazards.

Compared to the related art, the present disclosure has the following advantages: 1) the technical solution does not require establishment of a mathematical model for pedestrian crossing at the intersection in advance, and does not require the preparation of the massive labeled data sets in advance, and the present disclosure achieves autonomous learning of the interdependence and randomness features of pedestrian crossing at the intersection; and 2) the technical solution predicts pedestrian behaviors such as walking, stopping, and running when crossing the street at the intersection, and performs early-warning on the crossing pedestrians and the passing vehicles when there is danger.

DETAILED DESCRIPTION

In order to deepen the understanding of the present disclosure, embodiments are illustrated in detail below with reference to accompanying drawings.

Figure 1:
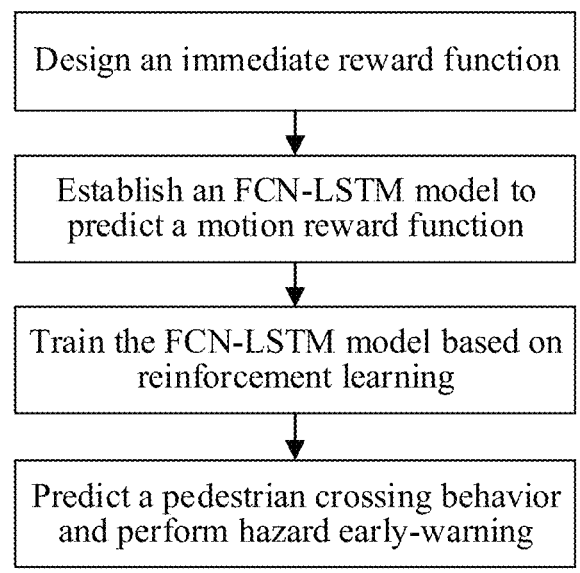
FIG. 1 is a schematic diagram of an overall solution of the present disclosure.

Embodiment 1: referring to FIG. 1, as a major participant in road traffic, a pedestrian's behavior is an important factor affecting traffic safety, especially at an intersection where there are a large amount of crossing behaviors at school entrances and exits and entrances without signal access. The quantity of traffic accidents that occur when pedestrians cross a street accounts for nearly 70% of the total quantity of pedestrian traffic accidents. Therefore, identification and prediction of a pedestrian crossing behavior at the intersection, especially real-time prediction of the pedestrian crossing behavior when inducing hazards such as pedestrian-vehicle collision and scratch, and hazard early-warning for crossing pedestrians and passing vehicles are basic requirements for building an intelligent roadside system, which is also conducive to reducing an incidence rate of traffic accidents at key road segments such as the intersection, and guaranteeing safety of the pedestrians in a traffic environment.

Currently, there are two main types of methods for predicting the pedestrian crossing behavior. One type of method is based on models, such as a social force model, an energy function or potential energy field model, and a Markov model. This type of model converts personality characteristics of pedestrian movement and interactions between the pedestrians and other traffic participants into concepts such as social force and potential energy fields, and utilizes a mathematical analytical expression of the social force or the potential energy fields to construct the models to further infer a pedestrian movement behavior. The other type of method is based on data-driven deep learning, such as a recurrent neural network (RNN), a long-short term memory (LSTM) network, a social long-short term memory (S-LSTM) network, a generative adversarial network (GAN), and a graph attention (GAT) network. The recurrent neural network (RNN) and the long-short term memory (LSTM) network regard a continuous behavior of the pedestrians as a time series, thereby realizing serialized prediction of the pedestrian behavior. On this basis, a social long-short term memory (S-LSTM) network model considers interdependence between the pedestrians and surrounding pedestrians, and utilizes different features of the surrounding pedestrians to predict a pedestrian movement trajectory. A model based on the generative adversarial network (GAN) can generate a plurality of acceptable pedestrian movement trajectories. A graph attention (GAT) network model enhances an inferential capability of pedestrian movement trajectory prediction by using a graph attention mechanism.

Although the current methods have achieved good effects in predicting a simple pedestrian behavior and interactions between the pedestrians, both the current two types of methods require establishment of a mathematical model of pedestrian movement in advance or construction of a large number of labeled data sets. For an environment, such as the intersection, where pedestrians share a space, the pedestrian crossing behavior is interdependent, meanwhile, influenced by factors such as an age, a gender, psychology, and an educational level, there are individual differences when the pedestrians cross the street, and there are behaviors with certain randomness, such as walking, stopping, and running. For the method based on the models, it is not possible to construct a clear mathematical model to describe the pedestrian crossing behavior at the intersection. For the method based on the data-driven deep learning, it is difficult to obtain massive labeled data sets to extract interdependence and randomness features of the pedestrian crossing behavior.

Aiming at the difficulties existing in the current method based on the models and method based on the data-driven deep learning in predicting the pedestrian crossing behavior at the intersection, it is necessary to invent a method for predicting a pedestrian crossing behavior at an intersection, which does not require the establishment of a complex pedestrian movement model in advance or the preparation of the massive labeled data sets. The method can achieve autonomous learning of pedestrian crossing behavior features at the intersection and predict their walking, stopping, running and other behaviors.

To achieve the objective of the present disclosure, a method for predicting a pedestrian crossing behavior based on deep reinforcement learning is invented. Millimeter wave radar and a visual camera are selected as roadside devices for data acquisition in the present disclosure. Firstly, a modified time-to-collision (MTTC) is taken as an immediate reward for a status; secondly, a fully convolutional neural network-long-short term memory network (FCN-LSTM) model is established to extract interdependence and randomness features of a pedestrian crossing behavior, and to predict a motion reward function value; then, the fully convolutional neural network-long-short term memory network (FCN-LSTM) model is trained based on reinforcement learning; and finally, pedestrian behaviors such as walking, running, and stopping when crossing a street are predicted, and hazard early-warning is performed on crossing pedestrians and passing vehicles. The method of the present disclosure does not require establishment of a complex pedestrian movement model or preparation of massive labeled data sets, achieves autonomous learning of pedestrian crossing behavior features at an intersection, predicts their walking, stopping, running and other behaviors, especially predicts the pedestrian crossing behavior when inducing hazards such as pedestrian-vehicle collision and scratch in real time, and performs hazard early-warning on the crossing pedestrians and the passing vehicles, which is conducive to reducing an incidence rate of traffic accidents at key road segments such as the intersection, and guaranteeing safety of the pedestrians in a traffic environment.

The method of the present disclosure specifically includes the following steps:

Step 1: design an immediate reward function.

A modified time-to-collision (MTTC) currently detected by roadside millimeter wave radar is taken as an immediate reward $r_t$ of a status. TTC only considers that a velocity of a vehicle behind is higher than a velocity of a vehicle ahead during defining of vehicle collision, and ignores many collisions caused by a difference in acceleration or deceleration. In particular, when a vehicle encounters crossing pedestrians at the intersection, the vehicle brakes to decelerate or accelerates to pass. As a result, hazards may be caused. Therefore, the modified time-to-collision (MTTC) that considers a relative position, relative velocity, and relative acceleration between the vehicle and a pedestrian is defined:

$$r_t = MTTC_t = \frac{\Delta V_t \pm \sqrt{\Delta V_t^2 + 2\Delta A_t \Delta X_t}}{\Delta A_t} \quad (1)$$

where $\Delta X_t$ represents the relative position, $\Delta V_t$ represents the relative velocity, $\Delta A_t$ represents the relative acceleration, and according to positive and negative conditions of $\Delta X_t$, $\Delta V_t$, and $\Delta A_t$, and by making $MTTC_t \geq 0$, ± in formula (1) is taken.

In a case that a plurality of pedestrians or a plurality of vehicles are detected within a certain status of the intersection, the MTTC between each pedestrian and all the vehicles is calculated according to formula (1), and a minimum MTTC is taken as an immediate reward $r_t$ for a current status of the pedestrian.

Step 2: establish a fully convolutional neural network-long-short term memory network (FCN-LSTM) model to predict a motion reward function.

In consideration of interdependence between pedestrian behaviors, which is manifested as spatial interdependence and mutual constraint of the pedestrians, a fully convolutional neural network (FCN) is utilized to realize semantic segmentation, pedestrians in an input image are separated from a background, and spatial information of the pedestrians in the input image is preserved. In addition, in consideration of temporal continuity of the pedestrian behaviors, a long-short term memory network (LSTM) is utilized to make use of forward behavior information of the pedestrians. The fully convolutional neural network-long-short term memory network (FCN-LSTM) model is established to predict a reward function value of the pedestrian behaviors, that is, a pedestrian crossing image at the intersection taken by a roadside camera is input to the FCN-LSTM model, and the FCN-LSTM model outputs reward function values corresponding to three discrete behaviors of walking, running, and stopping. A specific structure of the FCN-LSTM model is as follows:

1) A standard convolutional layer 1_1: an input of a first layer is an original image with pixels of Q×Q' and a channel number of 3, 96 11×11 convolutional kernels are used to be convolved with the original input image, a step length is 4, and edges are not expanded; rectified linear units (ReLU) serve as an activation function of neurons, and after ReLU activation, a feature map with a dimension of $$\frac{Q}{4} \times \frac{Q'}{4} \times 96$$

is output;

a local response normalization layer 1_2: to prevent data overfitting of the standard convolutional layer 1_1 after ReLU activation, local response normalization is performed; and a maximum pooling layer 1_3: a pooling layer is then connected to perform maximum pooling on an image outputted after convolution, a size of the pooling layer is 3×3, a step length is 2, and an output feature map of the first layer is obtained, which has a dimension of $$\frac{Q}{8} \times \frac{Q'}{8} \times 96.$$

2) A standard convolutional layer 2_1: an input of the convolutional layer 2 is the output feature map of the convolutional layer 1, the number of convolutional kernels is 256, the size of the convolutional kernels is: 5×5, edges are expanded with padding=2, and a step length is 1; after ReLU activation, a feature map with a dimension of $$\frac{Q}{8} \times \frac{Q'}{8} \times 256$$

is output;

a local response normalization layer 2_1: to prevent data overfitting of the standard convolutional layer 2_1 after ReLU activation, local response normalization is performed; and a maximum pooling layer 2_3: the pooling layer is then connected to perform maximum pooling on an image outputted after convolution, a size of the pooling layer is 3×β, a step length is 2, and an output feature map of a second layer is obtained, which has a dimension of $$\frac{Q}{16} \times \frac{Q'}{16} \times 256.$$

3) A standard convolutional layer 3_1: an input of the convolutional layer 3 is the output feature map of the convolutional layer 2, the number of convolutional kernels is 384, the size of the convolutional kernels is: 3×3, edges are expanded with padding=1, a step length is 1, and after ReLU activation, an output feature map of a third layer is obtained, which has a dimension of $$\frac{Q}{16} \times \frac{Q'}{16} \times 384.$$

4) A standard convolutional layer 4_1: an input of the convolutional layer 4 is the output feature map of the convolutional layer 3, the number of convolutional kernels is 384, the size of the convolutional kernels is: 3×3, edges are expanded with padding=1, a step length is 1, and after ReLU activation, an output feature map of a fourth layer is obtained, which has a dimension of $$\frac{Q}{16} \times \frac{Q'}{16} \times 384.$$

5) A standard convolutional layer 5_1: an input of the convolutional layer 5 is the output feature map of the convolutional layer 4, the number of convolutional kernels is 256, the size of the convolutional kernels is: 3×3, edges are expanded with padding=1, and a step length is 1; after ReLU activation, a feature map with a dimension of $$\frac{Q}{16} \times \frac{Q'}{16} \times 256$$

is output; and a maximum pooling layer 5_2: a pooling layer is then connected to perform maximum pooling, a size of the pooling layer is 3×3, a step length is 2, and an output feature map of a fifth layer is obtained, which has a dimension of $$\frac{Q}{32} \times \frac{Q'}{32} \times 256.$$

6) A fully convolutional layer 6_1: to allow an input picture to be any size larger than a certain size, an input of the fully convolutional layer 6 is the output feature map of the convolutional layer 5, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096.$$

7) A fully convolutional layer 7_1: an input of the fully convolutional layer 7 is the output feature map of the convolutional layer 6, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096,$$

8) Upsampling and skip structure processing: 32-times upsampling is performed on the output feature map of the fully convolutional layer 7_1, and 16-times upsampling is performed on the output feature map of the standard convolutional layer 4_1, to obtain an image of the same size as the original input image. Due to the too small output feature map of the fully convolutional layer 7_1 and excessive detail losses, in order to enable an output image of the fully convolutional layer 7_1 have richer global information and more local details, a skip structure is adopted. That is, a 32-times upsampling image of the output feature map of the fully convolutional layer 7_1 and a 16-times upsampling image of the output feature map of the standard convolutional layer 4_1 is added and fused to realize global prediction of the images while predicting local image details, and a Q×Q' segmented image is outputted as an input of the next layer.

9) An LSTM layer: in consideration of certain continuity of the pedestrian crossing behavior, in order to utilize the temporal continuity of the pedestrian behaviors, the LSTM layer is selected, an input dimension is Q, a time step is Q', and an output dimension is 3.

10) Output: the reward function values corresponding to the three behaviors of walking, running, and stopping of the pedestrians in the status are outputted. q(s, walking), q(s, running), q(s, stopping), S represents a current status of the pedestrians. A predicted value q_value={q(s, walking), q(s, stopping), q(s, running)} of the behavioral reward function is composed of q(s, walking), q(s, running), q(s, stopping).

Step 3: train the fully convolutional neural network-long-short term memory network (FCN-LSTM) model based on reinforcement learning.

The FCN-LSTM model established in step 2 is trained based on a reinforcement learning thought. In consideration of certain randomness of the behavior of the pedestrian in a case of crossing the street, in an iterative training process, pedestrian walking, stopping, and running behaviors are randomly selected with a probability of $\zeta$. The pedestrian behavior is greedily selected with a probability of $1-\zeta$, that is, a behavior corresponding to a maximum value of the behavior reward function outputted in 10) of step 2 is selected. Thus, the FCN-LSTM model is capable of learning characteristics that the pedestrian crossing behavior has certain purposiveness and different pedestrian individuals have certain randomness at the same time. Specific training steps are as follows:

Sub-step 1: initialize q(s, a)=0. q(s, a) represents a motion value function value of the pedestrians, s represents the current status, a represents a current behavior, and a∈{walking, stopping, running}. The current status s is initialized.

Sub-step 2: execute a one-step behavior. A random number random of [0,1] is randomly generated, and in a case of random <$\zeta$, a pedestrian behavior is randomly selected, that is, a behavior is randomly selected from a pedestrian behavior motion set {walking, stopping, running}; and random≥$\zeta$, $\zeta$ is intended to be valued as 0,1, and a greedy policy is used to select the pedestrian behavior, namely, a behavior that maximizes the value q(s, a) from the pedestrian behavior motion set {walking, stopping, running}.

Sub-step 3: update the status and the reward function values. After the pedestrian executes the one-step behavior, a new status s' is launched, and the reward function values are updated according to formula (2) by utilizing the immediate reward function $r_t$ designed in step 1.

$$q(s_t,a_t) \leftarrow q(s_t,a_t)+\alpha(r_t+\gamma \max_a q(s_{t+1},a)-q(s_t,a_t)) \quad (2)$$

where $q(s_t, a_t)$ represents a motion reward function value in the current status, t represents the time step, $\max_a q(s_{t+1}, a)$ represents a maximum motion reward function value in a next status, $\alpha$ represents an exploration rate, $\alpha$ is intended to be taken as 0.1, $r_t$ represents an immediate reward value in the current status, $\gamma$ represents a reward attenuation factor, that is, an impact of subsequent statuses on a current motion is decreased gradually, γ∈[0,1], and γ is intended to be valued as 0.95.

Sub-step 4: take updated q(s_t, a_t) in formula (2) as a true value, and take a maximum value of q_value={q(s, walking), q(s, stopping), q(s, running)} outputted by the FCN-LSTM model in step 2 as a predicted value; and train the FCN-LSTM model established in step 2 based on a gradient descent method, and optimize weight parameters of the FCN-LSTM model.

Sub-step 5: execute sub-step 2, sub-step 3, and sub-step 4 repeatedly until s terminates, that is, the pedestrian completes the crossing behavior.

Step 4: predict the pedestrian crossing behavior and perform hazard early-warning.

Step 3 is executed repeatedly to complete a plurality of rounds of training of the FCN-LSTM model. An image of a camera deployed on a roadside of the intersection is inputted to the trained FCN-LSTM model, the FCN-LSTM model outputs q_value={q(s, walking), q(s, stopping), q(s, running)}, and a behavior corresponding to max{q(s, walking), q(s, stopping), q(s, running)} is used as the pedestrian crossing behavior at the intersection predicted by the present disclosure. In a case that the predicted behavior is walking or running according to the current status, an early-warning signal is transmitted to the crossing pedestrian at the intersection to remind them of possible hazards.

Figure 2:
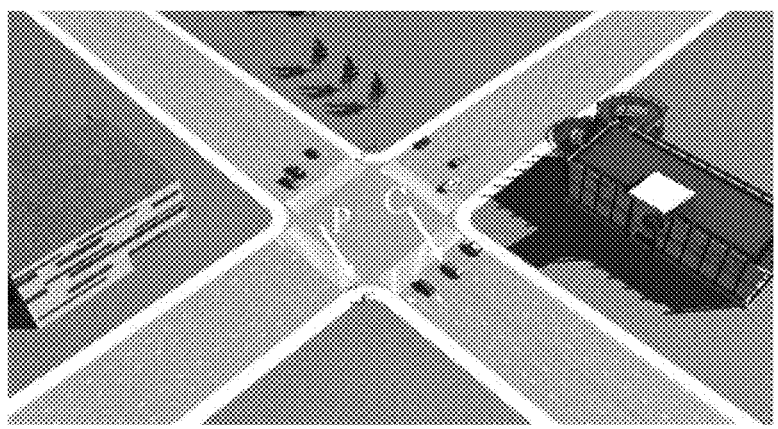
FIG. 2 is a test scenario diagram of a specific embodiment, where P represents a crossing pedestrian at an intersection, and C represents a vehicle.
Figure 3:
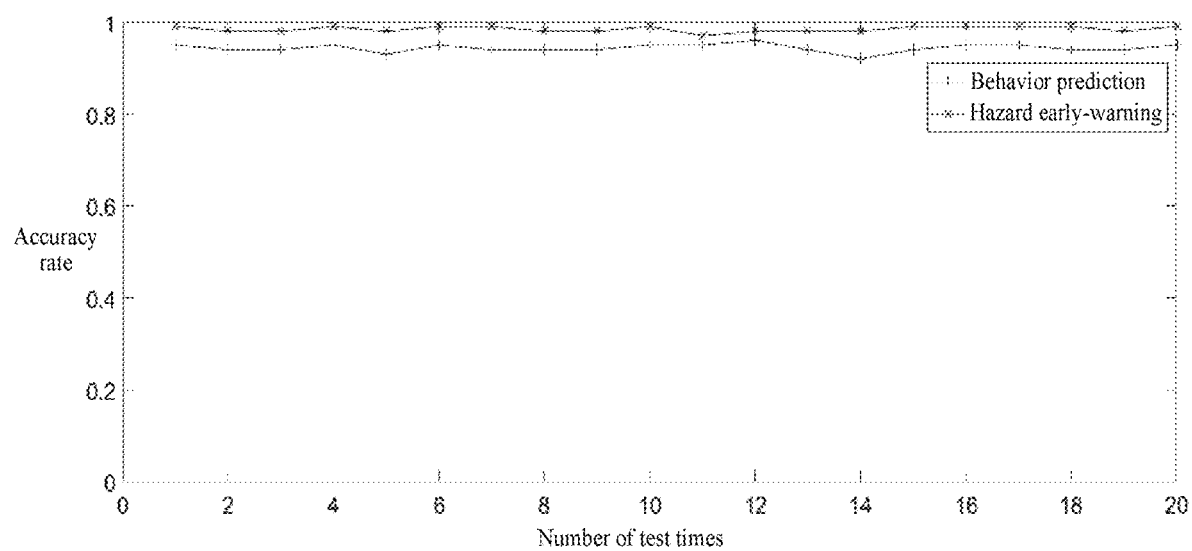
FIG. 3 is a result diagram of an accuracy rate of pedestrian crossing behavior prediction and hazard early-warning during test of an embodiment of the present disclosure.

In order to further verify the effect of the present disclosure, an intelligent vehicle and an intelligent traffic simulation testing platform prescan and matlab/simulink co-simulation platform are used to construct an intersection scenario as shown in FIG. 2. The millimeter wave radar and the visual camera are selected as roadside devices for data acquisition. After completing the training of the fully convolutional neural network-long-short term memory network (FCN-LSTM) model, the pedestrian crossing scenario at the intersection is randomly changed, the test is repeated 20 times, and the accuracy rate of pedestrian crossing behavior prediction and hazard early-warning is shown in FIG. 3. It can be seen that the method of the present disclosure can accurately predict the pedestrian crossing behavior at the intersection.

It is to be noted that the above embodiments are not intended to limit the scope of protection of the present disclosure, and equivalent transformations or substitutions made based on the above technical solutions fall within the scope of protection of the claims of the present disclosure.

What is claimed is:

1. A method for predicting a pedestrian crossing behavior for an intersection, comprising the following steps:
capturing an image of a vehicle and a pedestrian in an intersection using a camera;
acquiring information of the vehicle and the pedestrian using a millimeter wave radar as an immediate reward function and defining a modified time-to-collision (MTTC) based on a relative position, relative velocity, and relative acceleration between the vehicle and the pedestrian by using the acquired information;
extracting interdependence and randomness features of a pedestrian crossing behavior of the pedestrian from the acquired information by using the FCN-LSTM model;
utilizing, in consideration of the extracted interdependence and randomness features of the pedestrian crossing behavior, which is manifested as spatial interdependence and mutual constraint of pedestrians, a fully convolutional neural network (FCN) to realize semantic segmentation, separating pedestrians in the captured image from a background in the captured image, and preserving spatial information of the pedestrians in the captured image;
utilizing, in consideration of temporal continuity of the pedestrian behaviors, a long-short term memory network (LSTM) to make use of forward behavior information of the pedestrians;
establishing a fully convolutional neural network-long-short term memory network (FCN-LSTM) model to predict a reward function value of the pedestrian behaviors by inputting a pedestrian crossing image at the intersection taken by a camera to the FCN-LSTM model, and outputting, by the FCN-LSTM model, reward function values corresponding to walking, running, and stopping of the pedestrian;
training the fully convolutional neural network-long-short term memory network (FCN-LSTM) model based on reinforcement learning; and
predicting the pedestrian crossing behavior and performing hazard early-warning.

2. The method for predicting the pedestrian crossing behavior for the intersection according to claim 1, wherein designing the immediate reward function, is specifically as follows: calculating the immediate reward function $r_t$ by using formula (1):

$$r_t = MTTC_t = \frac{\Delta V_t \pm \sqrt{\Delta V_t^2 + 2\Delta A_t \Delta X_t}}{\Delta A_t} \quad (1)$$

wherein $\Delta X_t$ represents the relative position, $\Delta V_t$ represents the relative velocity, $\Delta A_t$ represents the relative acceleration, and according to positive and negative conditions of $\Delta X_t$, $\Delta V_t$, and $\Delta A_t$, and by making MITC$\geq$0, $\pm$ in formula (1) is taken; and in a case that a plurality of pedestrians or a plurality of vehicles are detected within a certain status of the intersection, the MTTC between each pedestrian and all the vehicles is calculated according to formula (1), and a minimum MTTC is taken as an immediate reward $r_t$ for a current status of the pedestrian.

3. The method for predicting the pedestrian crossing behavior for the intersection according to claim 2, wherein a specific structure of the FCN-LSTM model is as follows:
1) A standard convolutional layer 1_1: an input of a first layer is an original image with pixels of Q×Q' and a channel number of 3, 96 11×11 convolutional kernels are used to be convolved with the original input image, a step length is 4, and edges are not expanded; rectified linear units (ReLU) serve as an activation function of neurons, and after ReLU activation, a feature map with a dimension of $$\frac{Q}{4} \times \frac{Q'}{4} \times 96$$

is output;
a local response normalization layer 1_2: to prevent data overfitting of the standard convolutional layer 1_1 after ReLU activation, local response normalization is performed; and
a maximum pooling layer 1_3: a pooling layer is then connected to perform maximum pooling on an image outputted after convolution, a size of the pooling layer is 3×3, a step length is 2, and an output feature map of the first layer is obtained, which has a dimension of $$\frac{Q}{8} \times \frac{Q'}{8} \times 96;$$

2) A standard convolutional layer 2_1: an input of the convolutional layer 2 is the output feature map of the convolutional layer 1, the number of convolutional kernels is 256, the size of the convolutional kernels is: 5×5, edges are expanded with padding=2, and a step length is 1; after ReLU activation, a feature map with a dimension of $$\frac{Q}{8} \times \frac{Q'}{8} \times 256$$

is output;
a local response normalization layer 2_1: to prevent data overfitting of the standard convolutional layer 2_1 after ReLU activation, local response normalization is performed; and
a maximum pooling layer 2_3: the pooling layer is then connected to perform maximum pooling on an image outputted after convolution, a size of the pooling layer is 3×3, a step length is 2, and an output feature map of a second layer is obtained, which has a dimension of $$\frac{Q}{16} \times \frac{Q'}{16} \times 256;$$

3) A standard convolutional layer 3_1: an input of the convolutional layer 3 is the output feature map of the convolutional layer 2, the number of convolutional kernels is 384, the size of the convolutional kernels is: 3×3, edges are expanded with padding=1, a step length is 1, and after ReLU activation, an output feature map of a third layer is obtained, which has a dimension of $$\frac{Q}{16} \times \frac{Q'}{16} \times 384;$$

4) A standard convolutional layer 4_1: an input of the convolutional layer 4 is the output feature map of the convolutional layer 3, the number of convolutional kernels is 384, the size of the convolutional kernels is: 3×3, edges are expanded with padding=1, a step length is 1, and after ReLU activation, an output feature map of a fourth layer is obtained, which has a dimension of $$\frac{Q}{16} \times \frac{Q'}{16} \times 384;$$

5) A standard convolutional layer 5_1: an input of the convolutional layer 5 is the output feature map of the convolutional layer 4, the number of convolutional kernels is 256, the size of the convolutional kernels is: 3×3, edges are expanded with padding=1, and a step length is 1; after ReLU activation, a feature map with a dimension of $$\frac{Q}{16} \times \frac{Q'}{16} \times 256$$

is output; and
a maximum pooling layer 5_2: a pooling layer is then connected to perform maximum pooling, a size of the pooling layer is 3×3, a step length is 2, and an output feature map of a fifth layer is obtained, which has a dimension of $$\frac{Q}{32} \times \frac{Q'}{32} \times 256;$$

6) a fully convolutional layer 6_1: to allow an input picture to be any size larger than a certain size, an input of the fully convolutional layer 6 is the output feature map of the convolutional layer 5, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096;$$

7) a fully convolutional layer 7_1: an input of the fully convolutional layer 7 is the output feature map of the convolutional layer 6, the number of convolutional kernels is 4096, the size of the convolutional kernels is: 1×1, edge expansion is not performed, a step length is 1, and a dimension of the output feature map is:

$$\frac{Q}{32} \times \frac{Q'}{32} \times 4096;$$

8) upsampling and skip structure processing: 32-times upsampling is performed on the output feature map of the fully convolutional layer 7_1, and 16-times upsampling is performed on the output feature map of the standard convolutional layer 4_1, to obtain an image of the same size as the original input image; and due to the too small output feature map of the fully convolutional layer 7_1 and excessive detail losses, in order to enable an output image of the fully convolutional layer 7_1 have richer global information and more local details, a skip structure is adopted, that is, a 32-times upsampling image of the output feature map of the fully convolutional layer 7_1 and a 16-times upsampling image of the output feature map of the standard convolutional layer 4_1 are added and fused to realize global prediction of the images while predicting local image details, and a Q×Q' segmented image is outputted as an input of the next layer;

9) an LSTM layer: in consideration of certain continuity of the pedestrian crossing behavior, in order to utilize the temporal continuity of the pedestrian behaviors, the LSTM layer is selected, an input dimension is Q, a time step is Q', and an output dimension is 3; and 10) output: the reward function values corresponding to the three behaviors of walking, running, and stopping of the pedestrians in the status are outputted; and q(s, walking), q(s, running), q(s, stopping), S represents a current status of the pedestrians, and a predicted value q_value={q(s, walking), q(s, stopping), q(s, running)} of the behavioral reward function is composed of q(s, walking), q(s, running), q(s, stopping).

4. The method for predicting the pedestrian crossing behavior for the intersection according to claim 3, wherein training the fully convolutional neural network-long-short term memory network (FCN-LSTM) model based on reinforcement learning, is specifically as follows:

after training the FCN-LSTM model, selecting, in consideration of certain randomness of the behavior of the pedestrian in a case of crossing the street and in an iterative training process, pedestrian walking, stopping, and running behaviors randomly with a probability of ξ, and selecting the pedestrian behavior greedily with a probability of 1–ξ, that is, selecting a behavior corresponding to a maximum value of the behavior reward function outputted in 10), so that the FCN-LSTM model is capable of learning characteristics that the pedestrian crossing behavior has certain purposiveness and different pedestrian individuals have certain randomness at the same time, wherein a specific training step is as follows:

sub-step 1: initializing q(s,a)=0, q(s,a) representing a motion value function value of the pedestrians, s representing the current status, a representing a current behavior, and a∈{walking, stopping, running}; and initializing the current status S;

sub-step 2: executing a one-step behavior, randomly generating a random number random of [0,1], and in a case of random <ξ, randomly selecting a pedestrian behavior, that is, randomly selecting a behavior a pedestrian from behavior motion set {walking, stopping, running}; and random ≥ξ, ξ being intended to be valued as 0,1, using a greedy policy to select the pedestrian behavior, namely, a behavior that maximizes the value q(s,a) from the pedestrian behavior motion set {walking, stopping, running};

sub-step 3: updating the status and the reward function values; and entering, after the pedestrian executes the one-step behavior, into a new status s', and updating the reward function values according to formula (2) by utilizing the immediate reward function $r_t$;

$$q(s_t,a_t) \leftarrow q(s_t,a_t)+\alpha(r_t+\gamma \max_a q(s_{t+1},a)-q(s_t,a_t)) \quad (2)$$

wherein $q(s_t,a_t)$ represents a motion reward function value in the current status, t represents the time step, $\max_a q(s_{t+1},a)$ represents a maximum motion reward function value in a next status, α represents an exploration rate, and α is intended to be taken as 0.1, $r_t$ represents an immediate reward value in the current status, γ represents a reward attenuation factor, that is, an impact of subsequent statuses on a current motion is decreased gradually, γ∈[0,1], and γ is intended to be valued as 0.95;

sub-step 4: taking updated $q(s_t,a_t)$ in formula (2) as a true value, taking a maximum value of q_value={q(s, walking), q(s, stopping), q(s, running)} outputted by the FCN-LSTM model as a predicted value, training the FCN-LSTM model based on a gradient descent method, and optimizing weight parameters of the FCN-LSTM model; and sub-step 5: executing sub-step 2, sub-step 3, and sub-step 4 repeatedly until S terminates, that is, the pedestrian completes the crossing behavior.

5. The method for predicting the pedestrian crossing behavior for the intersection according to claim 3, wherein predicting the pedestrian crossing behavior and performing hazard early-warning, is specifically executing the step of training the fully convolutional neural network-long-short term memory network (FCN-LSTM) model based on the reinforcement learning repeatedly to complete a plurality of rounds of training of the FCN-LSTM model; and inputting an image of a camera deployed on a roadside of the intersection to the trained FCN-LSTM model, outputting q_value={q(s, walking), q(s, stopping), q(s, running)} by the FCN-LSTM model, taking a behavior corresponding to max{q(s, walking), q(s, stopping), q(s, running)} as the pedestrian crossing behavior at the intersection predicted, and transmitting, in a case that the predicted behavior is walking or running according to the current status, an early-warning signal to the crossing pedestrian at the intersection to remind them of possible hazards.

* * * * *